UNITED STATES PATENT OFFICE.

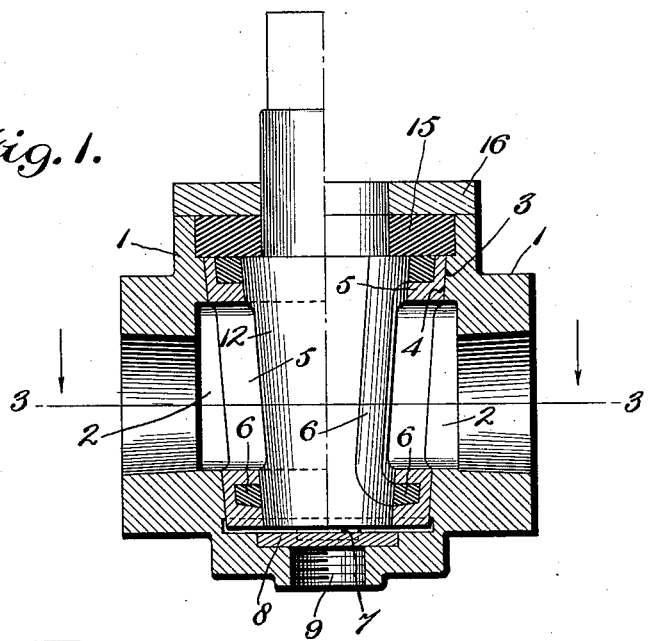
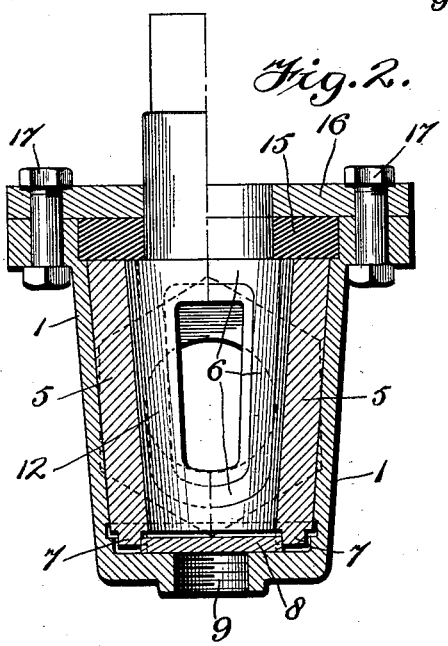
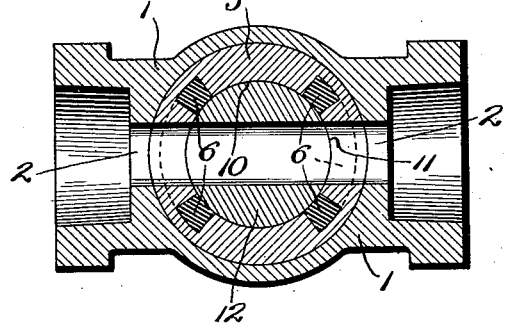
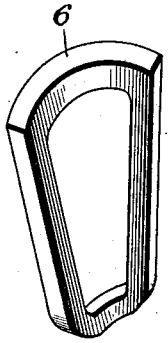

CHARLES H. REYNOLDS, OF ROCHESTER, NEW YORK.

COCK OR VALVE.

1,086,221.  Specification of Letters Patent.  Patented Feb. 3, 1914.

Application filed April 15, 1913. Serial No. 761,309.

*To all whom it may concern:*

Be it known that I, CHARLES H. REYNOLDS, a citizen of the United States, residing at Rochester, in the county of Monroe and State of New York, have invented certain new and useful Improvements in Cocks or Valves; and I do hereby declare the following to be a full, clear, and exact description of the invention, such as will enable others skilled in the art to which it appertains to make and use the same.

This invention relates to cocks or valves and has for its object to improve the construction of the packing means illustrated in my prior Patent #1,026,457 dated May 14, 1912.

With these and others objects in view the invention consists in the novel details of construction and combinations of parts more fully hereinafter disclosed and particularly pointed out in the claims.

Referring to the accompanying drawings forming a part of this specification in which like numerals designate like parts in all the views: Figure 1, is a sectional view of a cock made in accordance with my invention; Fig. 2, is a sectional view of the parts shown in Fig. 1, but taken on a plane at right angles to the plane on which Fig. 1 is taken; Fig. 3, is a sectional view taken on the line 3—3 of Fig. 1 looking in the direction of the arrows; and Fig. 4, is a perspective view of one of my packing rings.

1 indicates any suitable casing provided with the inlet and outlet ports 2, 2, and 3, an inner ground surface of said casing against which fits the outer ground surface 4 of the readily removable bushing or inner shell 5. The said shell 5, is provided on its inner surface with oblong recesses the shape of and into which fit the packing rings 6. In my patent above, these recesses opened on the inner surface 3 of the casing or outer shell 1, and therefore prevented the packing rings 6 from being removed until the bushing 5 was removed. In this invention, on the other hand, these recesses open on the inner surface of the bushing 5, as above stated, and do not necessarily require the removal of the said bushing when inserting new packings, which is an important feature of my present invention, as will presently appear. In order to hold the bushing 5 parallel to the port openings 2, I preferably provide one or more lugs such as 7, which may be conveniently located on the bottom of said bushing or at any other suitable place as may be desired. I may also, if desired, provide a plate 8 which may be disk shaped located in a recess between the lugs and an opening 9 for draining out the shell 1 and bushing 5, when desired. The opening 9 is further of great advantage in holding the body of the casing 1 during the grinding process, and it also affords a hole through which a tool may be passed to force out the bushing 5 and plug 12 when repairs are to be made. During this forcing out operation, the plate 8 is of great assistance in enabling one to drive the ground bushing 5 from the shell. The inner surface 10 of the bushing 5 is ground to fit the outer surface 11 of the plug 12, which surface 11 also contacts with the packing rings 6 to form a tight joint.

15 represents a top packing ring which overlies the ground surfaces 3 and 4 of the casing and bushing respectively and also insures a tight joint with the plug 12; while 16 is any suitable plate or other means for holding the parts together, 17 represents bolts or other devices for securing the plate 16 to the casing.

It will be observed that when the packing rings 6 are worn out, the same being on the inside of the shell or bushing 5 instead of on the outside as in my former patent above, the user may readily turn said bushing so as to close the ports 2, remove the plug 12, renew one or all of the packings, and then restore the plug 12 to its operative position, all without taking the cock from the line, which in many instances is a result of great importance. Further, should it be for any reason necessary or desirable, the user may as readily remove the entire bushing 5 and packings, immediately substitute a new one and replace the old plug 12.

It is obvious that those skilled in the art may vary the details of construction without departing from my invention and therefore I do not wish to be limited to the above disclosure except as may be required by the claims.

What I claim is:—

1. The combination of a valve casing provided with a drainage opening and with ports; a rotatable and readily removable bushing provided with ports adapted to register with said first named ports and also provided with an outer surface fitting said casing and with an inner surface having recesses surrounding said last named ports; packing rings located in said recesses; means comprising a lug for holding said bushing parallel to said first named ports; and a plug contacting with said inner surface and packing rings, substantially as described.

2. The combination of a valve casing provided with a drainage and opening with ports; a rotatable and readily removable bushing provided with ports adapted to register with said first named ports and also provided with an outer surface fitting said casing and with an inner surface having recesses surrounding said last named ports; packing rings located in said recesses; a circular top packing ring closing the joint between said bushing and casing; means comprising a lug for holding said bushing parallel to said first named ports; and a plug contacting with said inner surface and packing rings, substantially as described.

3. The combination of a valve casing provided with a drain opening; a rotatable and readily removable bushing fitting said casing; a readily removable and rotatable plug fitting said bushing; packing rings between said bushing and plug; lugs carried by said bushing; and a plate located between said lugs and covering said drain opening, substantially as described.

In testimony whereof I affix my signature, in presence of two witnesses.

CHARLES H. REYNOLDS [L. S.]

Witnesses:
JOHN TIGHE,
EDMUND WALSH.

---

Copies of this patent may be obtained for five cents each, by addressing the "Commissioner of Patents, Washington, D. C."